United States Patent
Yan et al.

(10) Patent No.: US 6,553,011 B1
(45) Date of Patent: Apr. 22, 2003

(54) CELLULAR MULTICARRIER WIRELESS COMMUNICATION SYSTEM

(75) Inventors: Ran-Hong Yan, Longcot (GB); Stephan ten Brink, Allmersbach im Tal (DE)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 09/188,026

(22) Filed: Nov. 6, 1998

(30) Foreign Application Priority Data

Nov. 11, 1997 (EP) .............................. 97309036

(51) Int. Cl.[7] .............................................. H04B 7/204
(52) U.S. Cl. ...................... 370/328; 370/342; 370/347; 370/522
(58) Field of Search ................................ 370/320, 321, 370/328, 342, 347, 522, 524

(56) References Cited

U.S. PATENT DOCUMENTS

| | | | |
|---|---|---|---|
| 5,128,934 A | * 7/1992 | Jasinski | 370/312 |
| 5,535,215 A | 7/1996 | Hieatti, III | 370/95.1 |
| 5,546,443 A | 8/1996 | Raith | 379/59 |
| 5,590,403 A | 12/1996 | Cameron et al. | 455/51.2 |
| 5,799,004 A | * 8/1998 | Keskitalo et al. | 370/335 |
| 5,903,834 A | * 5/1999 | Wallstedt et al. | 455/422 |
| 6,032,033 A | * 2/2000 | Morris et al. | 455/277.2 |
| 6,084,886 A | * 7/2000 | Dehner et al. | 370/458 |
| 6,167,056 A | * 12/2000 | Miller et al. | 370/441 |

OTHER PUBLICATIONS

Petrovic, R. et al "Multicarrier Modulation For Narrowband PCS" IEEE Transactions on Vehicular Technology vol. 43, No. 4 Nov. 1, 1994 pp. 856–862.

European Search Report dated Apr. 21, 1998.

* cited by examiner

Primary Examiner—Min Jung

(57) ABSTRACT

A cellular multicarrier wireless communication system is disclosed, in which base stations for a cluster of two or more respective cells transmit the same signaling information in synchronism on the same group of subcarriers. This allows the combination of several base station signals 'on the air' prior to the receiver's antenna, without using any additional hardware for signal combination in the mobile terminal.

6 Claims, 4 Drawing Sheets

CELLULAR MULTICARRIER WIRELESS COMMUNICATION SYSTEM

CROSS-REFERENCE TO RELATED APPLICATION

This application claims priority of European Patent Application No. 97309036.8, which was filed Nov. 11, 1997.

BACKGROUND OF THE INVENTION

1. Field of the Invention

This invention relates to cellular multicarrier wireless communication systems.

2. Description of Related Art

With multicarrier modulation, a data signal is split into several lower rate signals, such that the symbol time becomes large compared to the expected multipath delay spread. The subcarrier frequencies may be distributed in different ways. The simplest case is where each mobile terminal has a different but fixed and block of contiguous subcarriers. Other possibilities include hopping of the subcarriers, or the use of a random (non-contiguous set of subcarriers. These latter options have the advantage of reducing the variance of co-channel interference.

An important feature of multicarrier modulation is the cyclic symbol extension (also referred to as guard interval, or guard time). In the downlink, signal components can be delayed by multipath propagation of the signal from the mobile's dedicated base station. As long as the delay offset of delayed signal components is within the guard time, the multicarrier signal remains undistorted for detection at the mobile terminal. The receiver can make use of the whole energy of all delayed signal components by using non-coherent detection.

In this way, multicarrier modulation avoids the need for complex equalization to remove echoes.

Communication on a downlink or forward link from a base station to mobile terminal or user, can be distinguished into data communication on dedicated data channels, and signaling communication on dedicated signaling channels.

Conventional cellular systems apply different signaling channels in every cell. Thus, for each cell, signaling channels of neighboring cells are either experienced as inter-cell interference, or left unused which reduces spectral efficiency.

SUMMARY OF THE INVENTION

Against this background, in accordance with the invention there is provided a cellular multicarrier wireless communication system, in which base stations for a cluster of two or more respective cells transmit the same signaling information in synchronism on the same group of subcarriers, wherein a multiple access preamble is transmitted in each frame to identify the base station from which it is transmitted.

The ability of a multi carrier system to make use of the whole energy of all delayed signal components by using non-coherent detection allows a mobile terminal to receive a composite signal from more than one base station. Hence, multicarrier modulation together with cyclic symbol extension provides macrodiversity.

Ideally, when a signal from a base station is delayed beyond the guard time at the mobile terminal, the signal strength is sufficiently low, due to the distance from the base station, that the mobile station can accurately detect signals from closer base stations where the delay offset is inside the guard time.

The data communication is very different for each mobile terminal, since it carries e.g. voice data, or any other kind of mobile terminal specific data (e.g. multimedia data, image, etc.)

In contrast, signaling communication is not very different for each mobile terminal, since it contains information that is of relevance to all mobiles (e.g. timing reference for initial acquisition, number of mobile terminals in the system, latest billing prices, new software for terminal, time signal, or any other broadcast-like type of information).

The signaling communication also contains user specific data. Thus the signaling channels are used to control the operation of the mobile terminal, e.g. in standby mode the mobile terminal still has to listen to the signaling channel of its respective base station, since the signaling channel is used as a paging channel to wake up the terminal in case of an incoming call.

For the signaling channel the amount of information that is mobile specific, e.g. signaling information regarding the radio link protocol, is of low bit rate nature (incoming call signal, response signal for call request, etc.). That is why it is possible to use one signaling channel throughout the whole cellular system or throughout a smaller cluster of base stations. The number of subcarriers should be chosen according to the expected traffic on the signaling channel and is dependent on the number of users in system.

Preferably, signaling information is transmitted in successive frames each carrying address information identifying mobile stations for which signaling information in the frame is intended.

Signaling information could be addressed to all mobile terminals, to a set of mobile terminals or to individual mobile terminals.

The transmission of frames is preferably prioritized in favor of frames addressed to particular mobile stations.

In order to allow a mobile terminal to distinguish which base stations it is receiving signaling from, a code division multiple access preamble may be transmitted in each frame to identify the base station from which it is transmitted.

Alternatively, a time division multiple access preamble may be transmitted in each frame to identify the base station from which it is transmitted.

The invention also extends to a mobile station for a cellular multicarrier wireless station as claimed in any preceding claim, configured to receive signaling information on a common group of subcarriers within a cluster of two or more cells, in which non coherent detection is utilized in relation to symbols modulated on subcarriers in said group, in which the base station transmitting on the common channel are each identified from a multiple access preamble transmitted in each frame to identify the base station which it is transmitted, and including means to measure the strength of the multiple access signal from each base station.

BRIEF DESCRIPTION OF THE DRAWINGS

One embodiment of the invention will now be described, by way of example, with reference to the accompanying drawings, in which.

DETAILED DESCRIPTION

Figure 1:
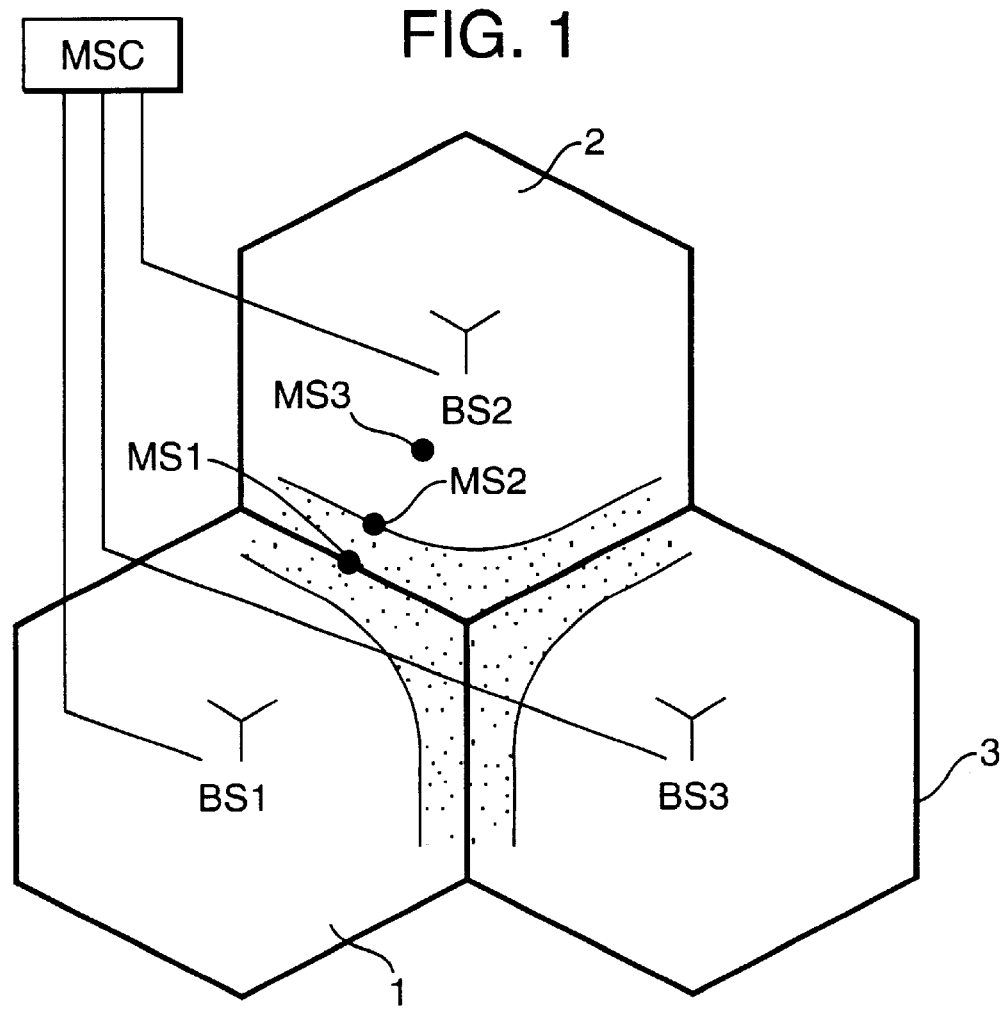
FIG. 1 is a diagrammatic plan showing a cluster of three cells in a cellular multicarrier wireless communication system embodying the invention.

Referring to the drawings, base stations BS1, BS2 and BS3 serve respective cells 1, 2 and 3 which are grouped in a cluster. The cluster may encompass all the cells in the system or merely a subset.

Figure 2:
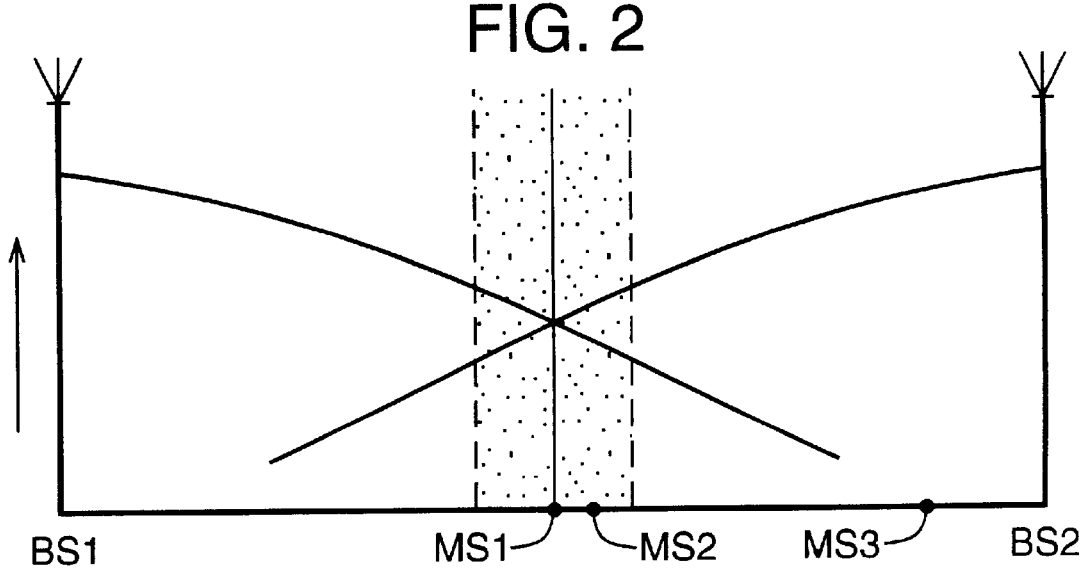
FIG. 2 is a diagram showing how signal strength varies between two base stations in the system of FIG. 1.

Each base station transmits synchronized signaling information on a set of sub carriers dedicated for signaling. FIG. 2 shows the signal strengths of signaling subcarrier components transmitted from the base stations BS1 and BS2 at positions on a line between the base stations BS1 and BS2. As will be appreciated, the further the position is from the originating base station the smaller the subcarrier component. FIG. 2 is illustrative only and is not to scale. Ideally, the composite signal power which can be detected by non coherent detection is roughly constant.

All base stations in the cluster use the same set of subcarriers for a common signaling channel, and transmit the same signals in synchronism on these subcarriers throughout the cluster of base stations. This makes it very easy for the mobile terminal to tune and to track the signaling channel. However, this may result in increased traffic in the signaling network (usually wired) that connects all the base stations.

The mobile terminal receives a sum of at least two base stations' signaling signals, resulting in a more reliable, stronger composite signaling signal at the cell boundaries. This effect is also referred to as "macrodiversity". In contrast, to achieve a similar reliability of the signaling signal at the cell boundaries of conventional systems, conventional base stations have to increase their transmit power, which is not desirable since the different signaling channels cause interference in neighboring cells.

The mobile terminal benefits most from the common signaling channel at the cell boundaries (shaded region in drawing).

The strong signaling signal at the cell boundaries allows a reduction in the mobile terminal's receiver sensitivity (e.g. less demanding baseband processing), in particular in standby mode (terminal, waiting for incoming calls), which directly relates to less power dissipation and thus extended standby battery time.

Figure 3A:
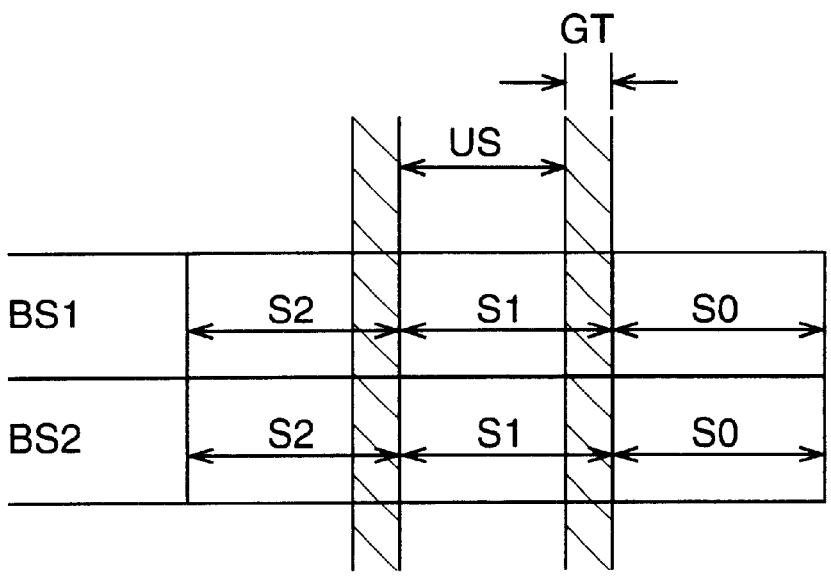
FIGS. 3a to 3c show the relative timing of symbols transmitted from two base stations at respective positions between them.
Figure 3B:
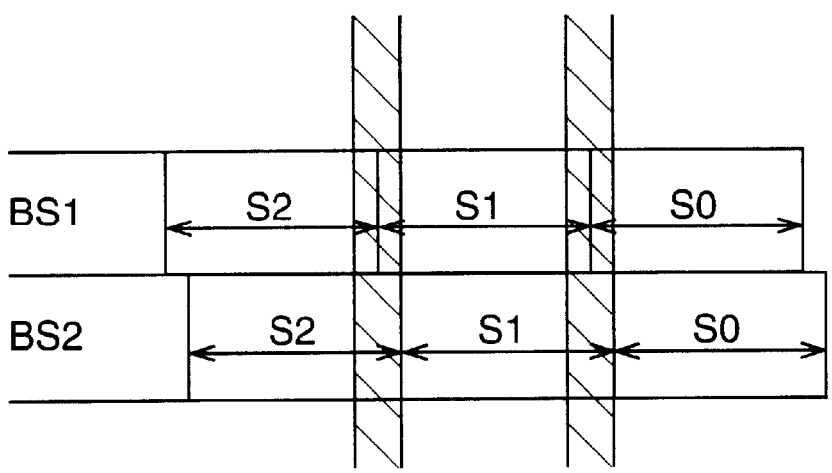
Figure 3C:
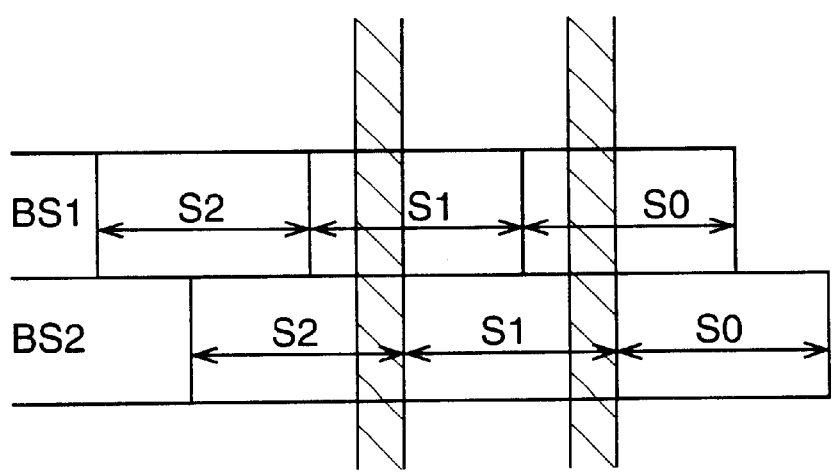

Referring to FIGS. 3a to 3c, the timing relation of three signaling symbols SO, S1 and S2 transmitted from the base stations BS1 and BS2 and arriving on the direct path are shown.

FIG. 3a shows the relationship for a mobile station MS1 located exactly half way on the boundary between the cells. Here the symbols from the two base stations are exactly in phase as illustrated. The Figure also shows a guard time GT.

The received signal is a composite of the signals from the two base stations on which the receiver performs non coherent detection. Processing in order to make a decision as to what state the symbol has, e.g. logical 0 or logical 1, is not started until after the end of the guard time GT. As is known, the received signal is processed to determine a placement for the guard time.

In FIG. 3b the relationship is shown for a mobile station MS2 which is nearer to the base station BS2. Here the beginning of the symbol S1 from base station BS1 is relatively delayed. The start of the delayed symbol is, however, within the guard time so in the period US (usable signal) a composite signal representing only the symbol S1 is processed.

In FIG. 3c the relationship is shown for a mobile station MS3 which is even nearer to the base station BS2. Here the start of the symbol S1 is so delayed that it falls outside the guard time. This has the effect that the composite signal processed in the period US contains a component from the delayed symbol SO from the base station BS1. Referring to FIG. 2, this component is so small, however, that it does not cause significant interference.

The mobile stations for which signaling information is intended is indicated by means of frame addressing: the bit stream of the common signaling channel is divided into frames, whereby each frame has an address header indicating to which mobile the frame information payload is intended (e.g. address −1 means: frame contains information for all mobiles in the system). By means of this addressing all, a set of, or a single specific mobile terminal can be addressed. The signaling information is centrally controlled by a Mobile Switching Center (MSG), see FIG. 1, and may be prioritized in favor of critical user specific signaling information (incoming call, etc.)

Since the same set of subcarriers carrying the same signaling information is transmitted from all base stations, the mobile would not be able to distinguish between the signals of the different base stations. To allow for identification of which base stations the mobile terminal is receiving from, and with what signal strength, a preamble is included in each frame of the common signaling channel. This preamble may be using Time Division Multiple Access (TDMA) or Code Division Multiple Access (CDMA) technique to distinguish between different base stations.

Figure 4:
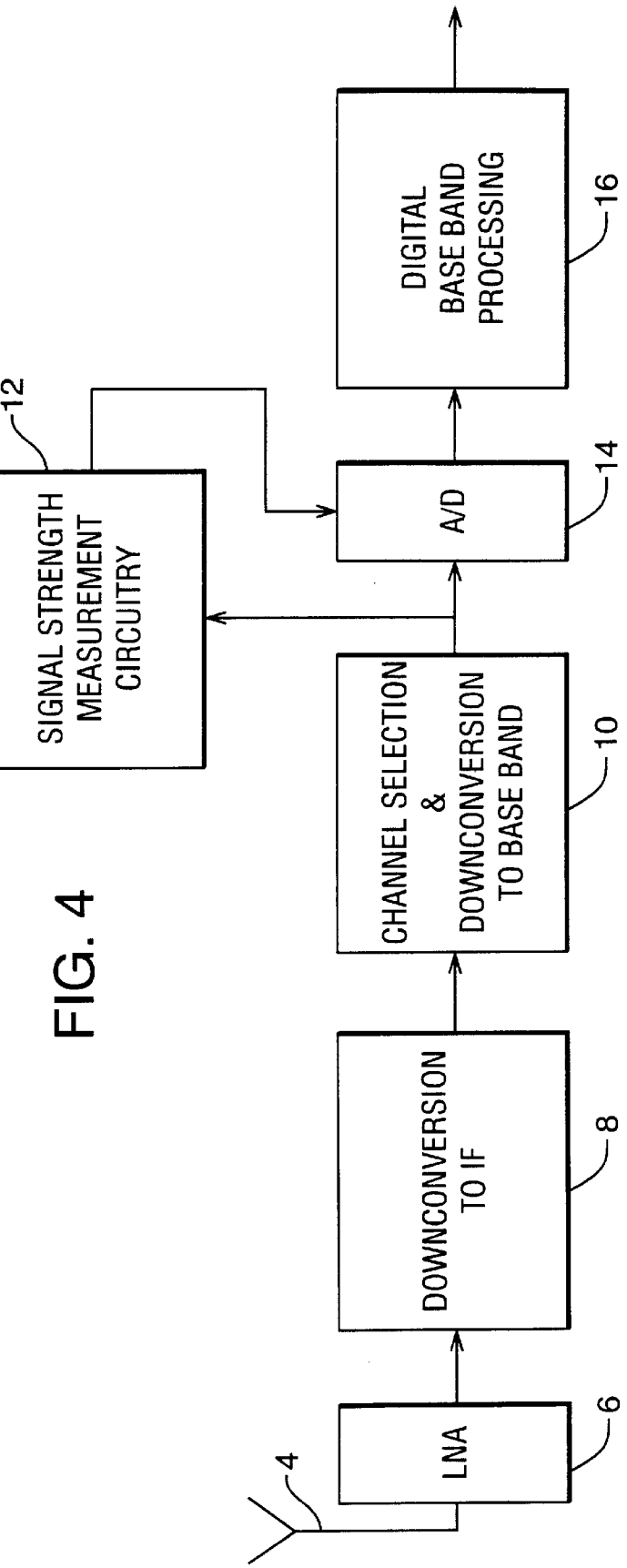
FIG. 4 is a block diagram of modules in a TDMA receiver for measuring signal strength.

In TDMA simply N different time slots (herein equivalent to multicarrier symbols) are reserved for distinguishing N different base stations. Each base station transmits an identity signal in a time slot which is assigned to it. Time slots can be re-used by base stations which are too far apart for there to be significant interference. Different base stations re-using the same time slot use different identity signals. Referring to FIG. 4, the preamble signals are received by an antenna 4 and amplified by a low noise amplifier 6. The amplified signals are converted to intermediate frequency IF in a down converter 8. The common signaling channel is selected and converted to base band in a channel selector and down converter 10. The base band signal is fed to (analog) signal strength measurement circuitry 12 where the relative strengths of different preambles are determined and the analog output is supplied to a control input of an analog to digital converter 14 to control the dynamic range of the conversion of the base band signals from the channel selector and down converter 10. The digital output signals from the analog to digital converter 14 are supplied to a base band processor to extract the identity of the base station from which the preamble was received.

Figure 5:
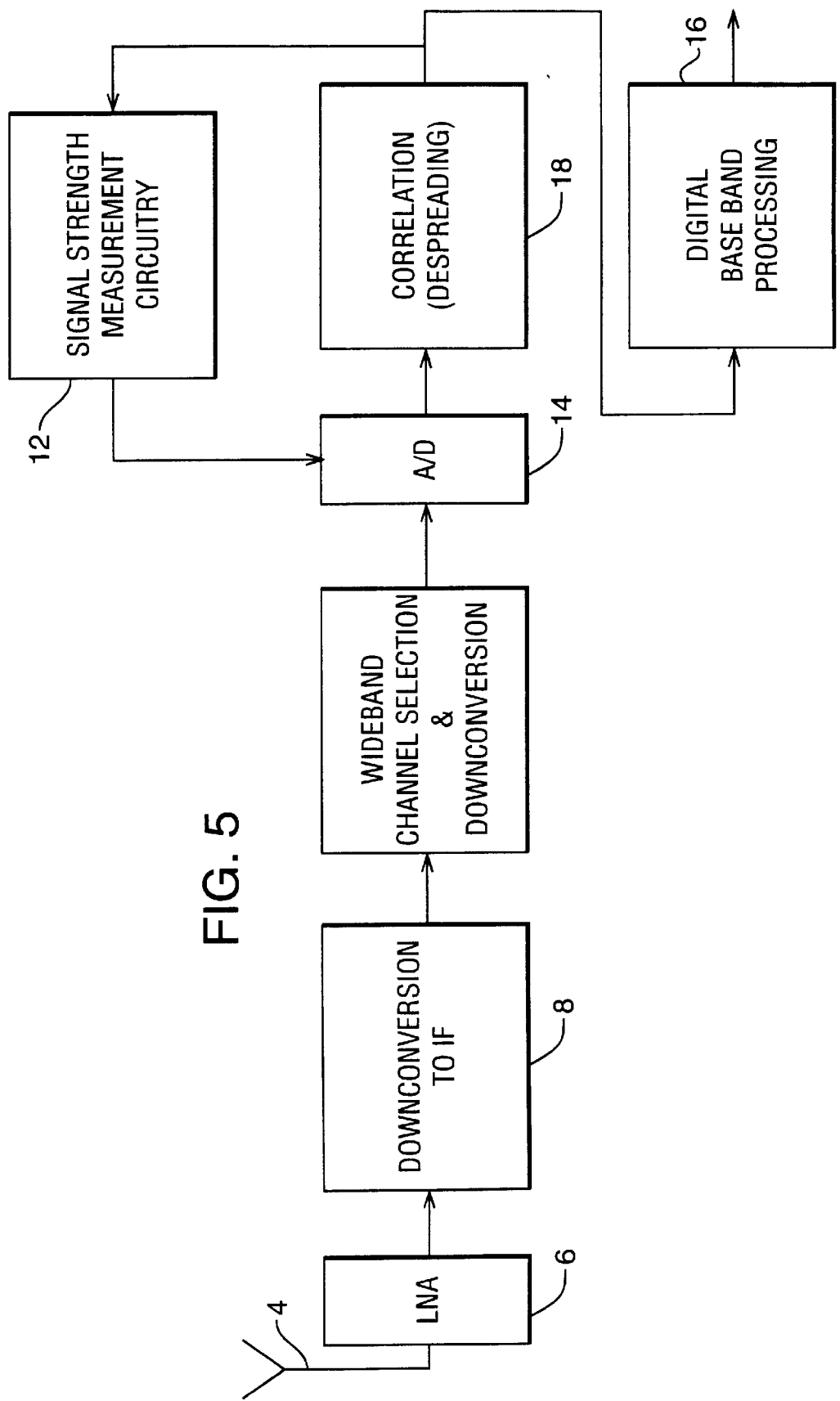
FIG. 5 is a block diagram of modules in a CDMA receiver for measuring signal strength.

In CDMA N different channelization codes (preferably orthogonal e.g. Walsh codes) are used for distinguishing N different base stations. Again, the codes can be re-used by base stations which are sufficiently far apart. Referring to FIG. 5, the apparatus is similar, except that the signal strength is measured after the different preambles have been despread in a correlator 18 which correlates the received signals with their channelization code.

The signal strength and identity of all currently received base stations are reported to the base stations where a dynamic channel allocation algorithm is used to allocated a base station and a channel, for data (e.g. voice) communication with the mobile terminal.

What is claimed is:

1. A cellular multicarrier wireless communication system, in which base stations for a cluster of two or more respective cells transmit the same signaling information in synchronism on the same group of subcarriers, said transmission of said same signaling information in synchronism on said same group of subcarriers causing a more reliable and stronger composite signal of said same signaling information at cell boundaries, wherein a multiple access preamble is transmitted in each frame to identify the base station from which it is transmitted.

2. A system as claimed in claim 1, wherein the preamble is a time division multiple access signal.

3. A system as claimed in claim 1, wherein the preamble is a code division multiple access signal.

4. A system as claimed in claim 1, wherein signaling information is transmitted in successive frames each carrying address information identifying mobile stations for which signaling information in the frame is intended.

5. A system as claimed in claim 4, wherein transmission of frames is prioritized in favor of frames addressed to particular mobile stations.

6. A mobile station for a cellular multicarrier wireless station as claimed in claim 1, configured to receive signaling information on a common group of subcarriers within a cluster of two or more cells, in which non coherent detection is utilized in relation to symbols modulated on subcarriers in said group, in which the base station transmitting on the common channel are each identified from a multiple access preamble transmitted in each frame to identify the base station which it is transmitted, and including means to measure the strength of the multiple access signal from each base station.

* * * * *